(12) United States Patent
Zeng

(10) Patent No.: US 10,870,258 B2
(45) Date of Patent: Dec. 22, 2020

(54) STRETCH RELEASING ADHESIVE ASSEMBLY, HOUSING ASSEMBLY AND MOBILE TERMINAL

(71) Applicant: GUANGDONG OPPO MOBILE TELECOMMUNICATIONS CORP., LTD., Guangdong (CN)

(72) Inventor: Yuanqing Zeng, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 162 days.

(21) Appl. No.: 15/988,410

(22) Filed: May 24, 2018

(65) Prior Publication Data
US 2019/0061316 A1 Feb. 28, 2019

(30) Foreign Application Priority Data

Aug. 24, 2017 (CN) .......................... 2017 1 0736323
Aug. 24, 2017 (CN) ...................... 2017 2 1073010 U

(51) Int. Cl.
*B32B 7/12* (2006.01)
*C09J 201/02* (2006.01)
(Continued)

(52) U.S. Cl.
CPC .................. *B32B 7/12* (2013.01); *C09J 7/10* (2018.01); *C09J 7/25* (2018.01); *C09J 7/403* (2018.01); *C09J 201/02* (2013.01); *G06F 1/1613* (2013.01); *H01M 2/1066* (2013.01); *H04M 1/026* (2013.01); *H04W 88/00* (2013.01); *C09J 2203/318* (2013.01); *C09J 2203/326* (2013.01); *C09J 2203/33* (2013.01);
(Continued)

(58) Field of Classification Search
None
See application file for complete search history.

(56) References Cited

U.S. PATENT DOCUMENTS 6,071,583 A 6/2000 Pomerantz
6,541,089 B1 * 4/2003 Hamerski .................. C09J 7/10
428/40.1
(Continued)

FOREIGN PATENT DOCUMENTS

CN 205490523 8/2016
CN 206076338 4/2017
(Continued)

OTHER PUBLICATIONS

EPO, Office Action for EP Application No. 18174288, dated Aug. 24, 2018.
(Continued)

*Primary Examiner* — Alexandre F Ferre
(74) *Attorney, Agent, or Firm* — Hodgson Russ LLP

(57) ABSTRACT

The present disclosure provides a stretch releasing adhesive assembly, a housing assembly, and a mobile terminal. The stretch releasing adhesive assembly includes: a stretch releasing adhesive layer, having a pull portion at an end of the stretch releasing adhesive layer; and a first pull layer, the first pull layer and the pull portion being superposed and connected, the first pull layer being provided with at least one tear line in a position corresponding to the pull portion.

20 Claims, 6 Drawing Sheets

(51) Int. Cl.
*G06F 1/16* (2006.01)
*H04M 1/02* (2006.01)
*C09J 7/40* (2018.01)
*H01M 2/10* (2006.01)
*C09J 7/25* (2018.01)
*C09J 7/10* (2018.01)
*H04W 88/00* (2009.01)

(52) U.S. Cl.
CPC ...... *C09J 2301/16* (2020.08); *C09J 2301/308* (2020.08); *C09J 2467/006* (2013.01); *C09J 2479/086* (2013.01)

(56) References Cited

U.S. PATENT DOCUMENTS

| | | |
|---|---|---|
| 2009/0000722 A1 | 1/2009 | Bartusiak |
| 2015/0064386 A1* | 3/2015 | Mag .................. H04M 1/0279 428/41.8 |
| 2016/0332789 A1 | 11/2016 | Yerecic |

FOREIGN PATENT DOCUMENTS

| | | |
|---|---|---|
| CN | 106659030 | 5/2017 |
| CN | 107395814 | 11/2017 |
| CN | 207124661 | 3/2018 |
| WO | 9506691 | 3/1995 |
| WO | 0114488 | 3/2001 |
| WO | 2017127293 | 7/2017 |

OTHER PUBLICATIONS

WIPO, English translation of the ISR/WO for PCT/CN2018/100191, dated Nov. 1, 2018.

* cited by examiner

STRETCH RELEASING ADHESIVE ASSEMBLY, HOUSING ASSEMBLY AND MOBILE TERMINAL

CROSS-REFERENCE TO RELATED APPLICATIONS

The application claims priority to and benefits of Chinese Patent Application Serial No. 201710736323.0, filed with the State Intellectual Property Office of P. R. China on Aug. 24, 2017, and Chinese Patent Application Serial No. 201721073010.3, filed with the State Intellectual Property Office of P. R. China on Aug. 24, 2017, the entire content of which is incorporated herein by reference.

FIELD

The present disclosure relates to a technical field of mobile terminals, and more particularly, to a stretch releasing adhesive assembly, a housing assembly, and a mobile terminal.

BACKGROUND

An exposed pull part of a stretch releasing adhesive is susceptible to aging and breakage due to influence of water vapor in the air. When in need of being pulled, the pull breaks, and the stretch releasing adhesive cannot be pulled out, such that a component (like a battery) bonded with the stretch releasing adhesive cannot be removed easily, thereby affecting the use. In the related art, a measure that relies on the entire machine to prevent water vapor from entering a mobile phone is adopted, but this measure has a high requirement for the overall protection of the mobile phone and exerts a large influence on costs. If the mobile phone or other mobile terminals loses protection after multiple drops and collisions, the stretch releasing adhesive is easily broken due to the influence of water vapor.

SUMMARY

The present disclosure provides a stretch releasing adhesive assembly.

The present disclosure further provides a housing assembly that includes the above stretch releasing adhesive assembly.

The present disclosure further provides a mobile terminal that includes the above stretch releasing adhesive assembly.

The stretch releasing adhesive assembly according to embodiments of the present disclosure includes: a stretch releasing adhesive layer, having a pull portion at an end of the stretch releasing adhesive layer; and a first pull layer, the first pull layer and the pull portion are superposed and connected, the first pull layer being provided with at least one tear line in a position corresponding to the pull portion.

The housing assembly according to embodiments of the present disclosure includes: a housing; a battery provided on the housing; and the above stretch releasing adhesive assembly, the stretch releasing adhesive assembly being provided between the housing and the battery, and at least a part of the pull portion going beyond an end face of the battery.

The mobile terminal according to embodiments of the present disclosure includes the above housing assembly.

BRIEF DESCRIPTION OF THE DRAWINGS

These and additional aspects and advantages of embodiments of the present disclosure will become apparent and more readily appreciated from the following descriptions made with reference to the drawings, in which.

Figure 1:
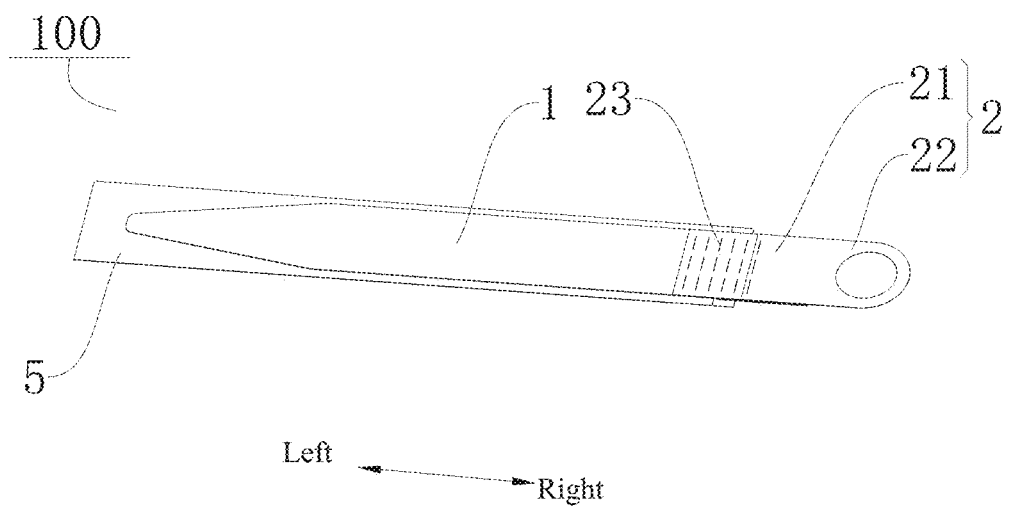
FIG. 1 illustrates a perspective view of a stretch releasing adhesive assembly according to an embodiment of the present disclosure.
Figure 2:
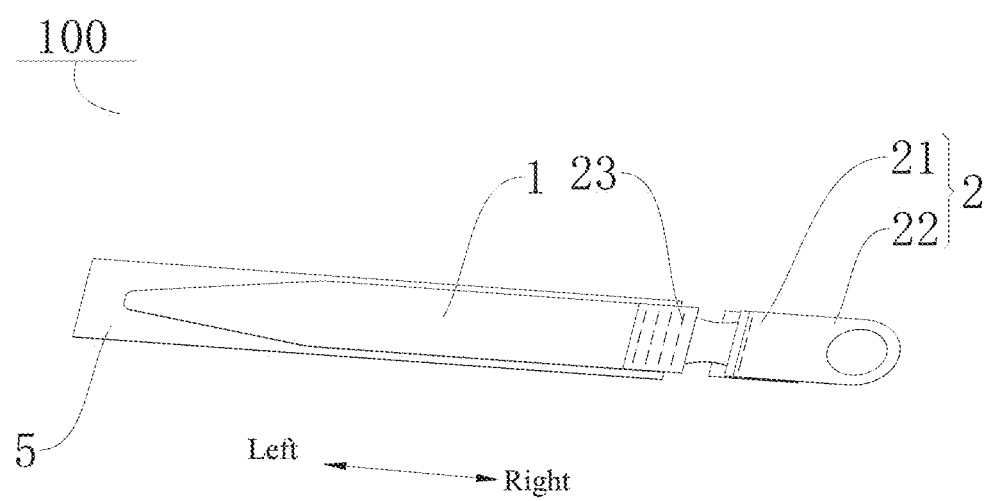
FIG. 2 illustrates a perspective view of a stretch releasing adhesive assembly according to an embodiment of the present disclosure, in which a pull is broken from a tear line.

REFERENCE NUMERALS mobile terminal 2000,
housing assembly 1000,
stretch releasing adhesive assembly 100,
stretch releasing adhesive layer 1, pull portion 11,
first pull layer 2, first segment 21, second segment 22, tear line 23,
second pull layer 4, covering film 5, double-sided adhesive 6,
battery 200, housing 300.

DETAILED DESCRIPTION

Embodiments of the present disclosure will be described in detail and examples of the embodiments will be illustrated in the accompanying drawing. The same or similar elements and the elements having same or similar functions are denoted by like reference numerals throughout the descriptions. The embodiments described herein with reference to the drawings are explanatory, which aim to illustrate the present disclosure, but shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation or position as then described or as illustrated in the drawings under discussion. These relative terms are for convenience of description, and do not indicate or imply that the device or element referred to must have a particular orientation or be constructed and operated in a particular orientation, and hence cannot be constructed to limit the present disclosure. In addition, the feature defined with "first" and "second" may indicate or imply including one or more of this feature. In the description of the present disclosure, the term "a plurality of" means two or more than two, unless specified otherwise.

In the description of the present disclosure, it should be understood that, unless specified or limited otherwise, the terms "mounted," "connected," and "coupled" and variations thereof are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

The present disclosure provides a stretch releasing adhesive assembly.

The stretch releasing adhesive assembly according to embodiments of the present disclosure includes: a stretch releasing adhesive layer, having a pull portion at an end of the stretch releasing adhesive layer; and a first pull layer, the first pull layer and the pull portion are superposed and connected, the first pull layer being provided with at least one tear line in a position corresponding to the pull portion.

The housing assembly according to embodiments of the present disclosure includes: a housing; a battery provided on the housing; and the above stretch releasing adhesive assembly, the stretch releasing adhesive assembly being provided between the housing and the battery, and at least a part of the pull portion going beyond an end face of the battery.

The mobile terminal according to embodiments of the present disclosure includes the above housing assembly.

A stretch releasing adhesive assembly 100 according to embodiments of the present disclosure will be described below with reference to FIGS. 1-11.

As illustrated in FIGS. 1-4, the stretch releasing adhesive assembly 100 according to embodiments of the present disclosure includes a stretch releasing adhesive layer 1 and a first pull layer 2.

Specifically, the stretch releasing adhesive layer 1 is in a strip shape, an end (a left end illustrated in FIG. 1) of the stretch releasing adhesive layer 1 is a pointed end. That is, in a length direction of the stretch releasing adhesive layer 1, and in a direction from an end of the stretch releasing adhesive layer 1 to the other end of the stretch releasing adhesive layer 1, i.e. a left-to-right direction illustrated in FIG. 1, at least a part of the stretch releasing adhesive layer 1 has a gradually increased width. For example, as illustrated in FIG. 1, the left end of the stretch releasing adhesive layer 1 is the pointed end and has a width gradually increasing in the left-to-right direction. The other end (a right end illustrated in FIG. 1) of the stretch releasing adhesive layer 1 is a flat end and has a pull portion 11. When the stretch releasing adhesive assembly 100 is bonded in a housing assembly 1000, at least a part of the pull portion 11 is located outside the two adjacent components bonded together, and the stretch releasing adhesive layer 1 can be pulled out by pulling the pull portion 11 to realize separation of the two bonded components.

The first pull layer 2 is superposed on the pull portion 11 and is connected with the pull portion 11, and the first pull layer 2 is provided with at least one tear line 23 in a position corresponding to the pull portion 11. For example, as illustrated in FIGS. 1-4, the first pull layer 2 is provided with a plurality of tear lines 23 spaced apart from one another in the position corresponding to the pull portion 11.

It should be noted that the tear line 23 can be an incision formed by partially incising the first pull layer 2 along a length direction of the tear line 23, only a part of the first pull layer 2 is cut to from the incision, and no gap exists between parts of the first pull layers 2 on both sides of the incision. The tear line 23 is designed to protect the stretch releasing adhesive layer 1 effectively, avoid invasion of water vapor, and at the same time prevent the stretch releasing adhesive layer 1 from being bonded on two surfaces, which would otherwise cause the stretch releasing adhesive layer 1 to be unable to be pulled. For instance, in the example illustrated in FIG. 1, a plurality of incisions are provided and spaced along the length direction of the tear line 23.

In the related art, a pull part of a stretch releasing adhesive assembly is exposed and susceptible to aging and breakage due to influence of water vapor in the air. When in need of being pulled, the pull part breaks, and the stretch releasing adhesive layer cannot be pulled out, such that a component (like a battery) bonded with the stretch releasing adhesive cannot be removed easily, thereby affecting the use.

The pull portion 11 is provided with the first pull layer 2 superposed thereon, and the first pull layer 2 is provided with at least one tear line 23, in which the tear line 23 is formed by only partially cutting the first pull layer 2 and substantially no gap is created. In a usual situation of no external force, the first pull layer 2 can satisfy a function of hiding and shielding the pull portion 11, prevent the pull portion 11 which is covered by the first pull layer 2 from being invaded by water vapor, and hence prevent the pull portion 11 from aging and breaking due to the invasion of water vapor. When repair of a mobile terminal 2000 (like a mobile phone) needs a battery 200 to be disassembled, the first pull layer 2 under stress is broken in time at the tear line 23, and the pull portion 11 is not easy to fail and break, such that the stretch releasing adhesive layer 1 can be pulled out easily, in which a drawing force causing the break at the tear line 23 can be adjusted by changing a length of the incision.

For the stretch releasing adhesive assembly 100 according to embodiments of the present disclosure, by providing the pull portion 11 of the stretch releasing adhesive layer 1 with the first pull layer 2, and providing the first pull layer 2 with at least one tear line 23, the function of hiding and shielding the pull portion 11 of the stretch releasing adhesive layer 1 can be satisfied, and the first pull layer 2 can be broken in time when in need of being pulled, such that the stretch releasing adhesive layer 1 is able to be pulled out easily.

In some embodiments of the present disclosure, as illustrated in FIGS. 1-4, a plurality of tear lines are provided and are parallel to each other. Thus, it is possible to increase the possibility of breakage of the first pull layer 2 under stress; the parallel arrangement of the plurality of tear lines 23 facilitates the breakage of the first pull layer 2 at at least one of the tear lines 23. For instance, in the example illustrated by FIG. 1, six tear lines 23 are provided in parallel. Certainly, the present disclosure is not limited thereto—one, two, three, four, five, or more tear lines 23 may be provided. When the first pull layer 2 is subjected to the drawing force, the first pull layer 2 is broken at at least one tear line 23.

Figure 3:
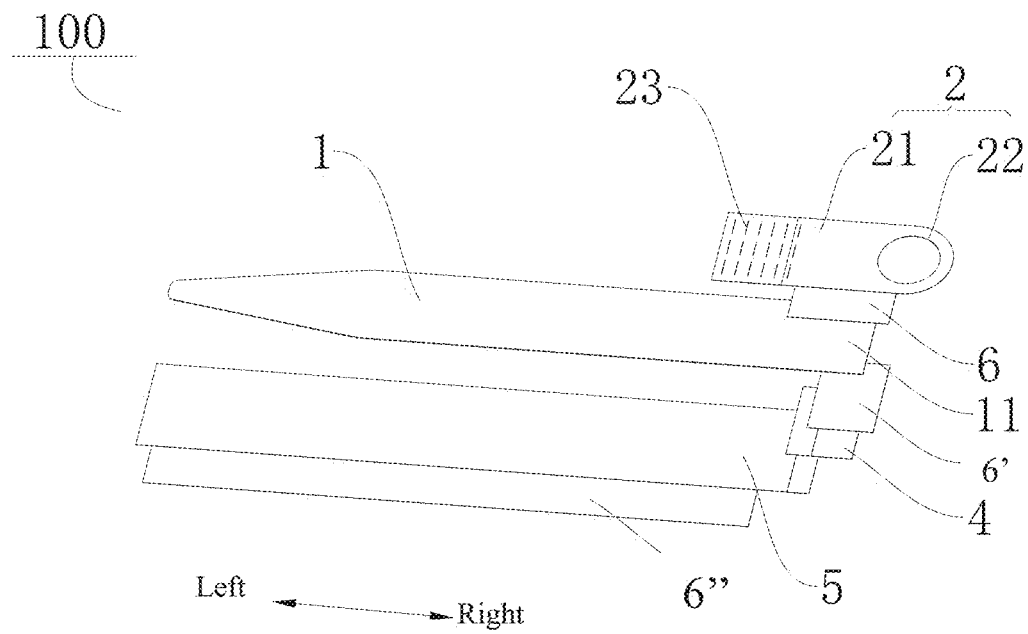
FIG. 3 illustrates an exploded view of a stretch releasing adhesive assembly according to an embodiment of the present disclosure.
Figure 4:
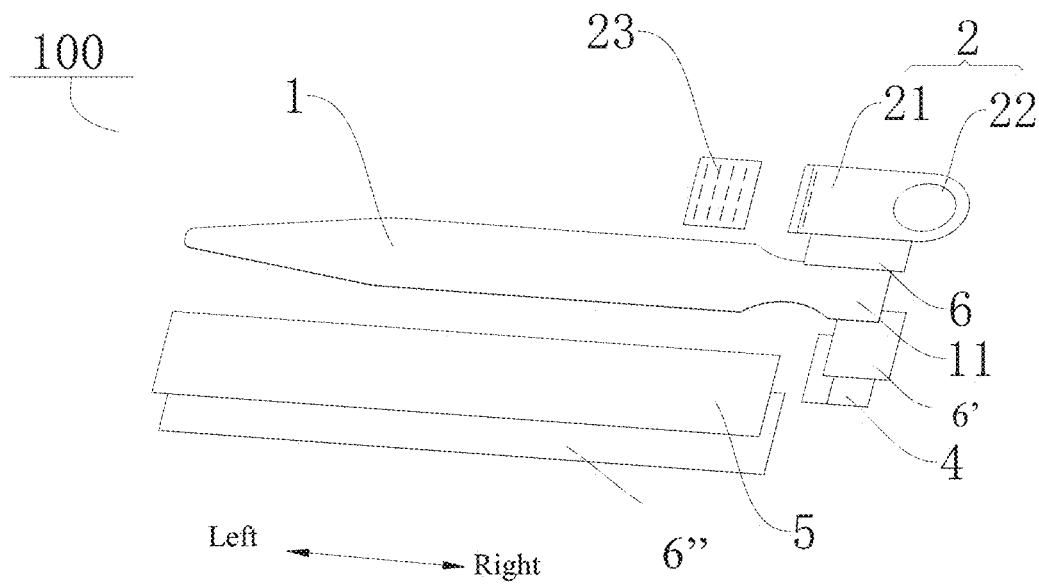
FIG. 4 illustrates an exploded view of a stretch releasing adhesive assembly according to an embodiment of the present disclosure, in which a pull is broken from a tear line.
Figure 5:
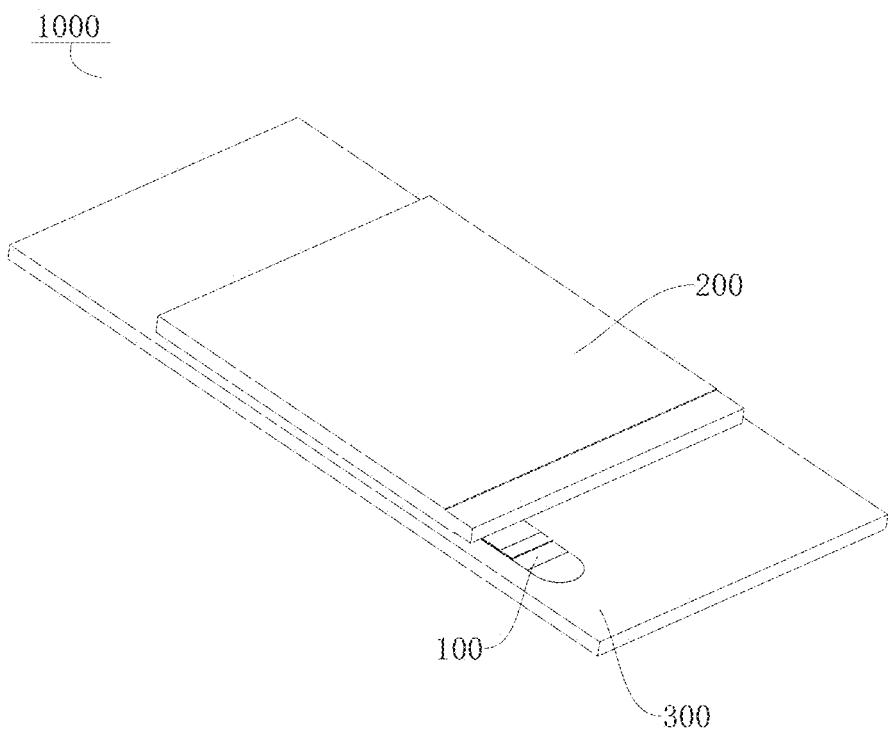
FIG. 5 illustrates a perspective view of a housing assembly according to an embodiment of the present disclosure.
Figure 6:
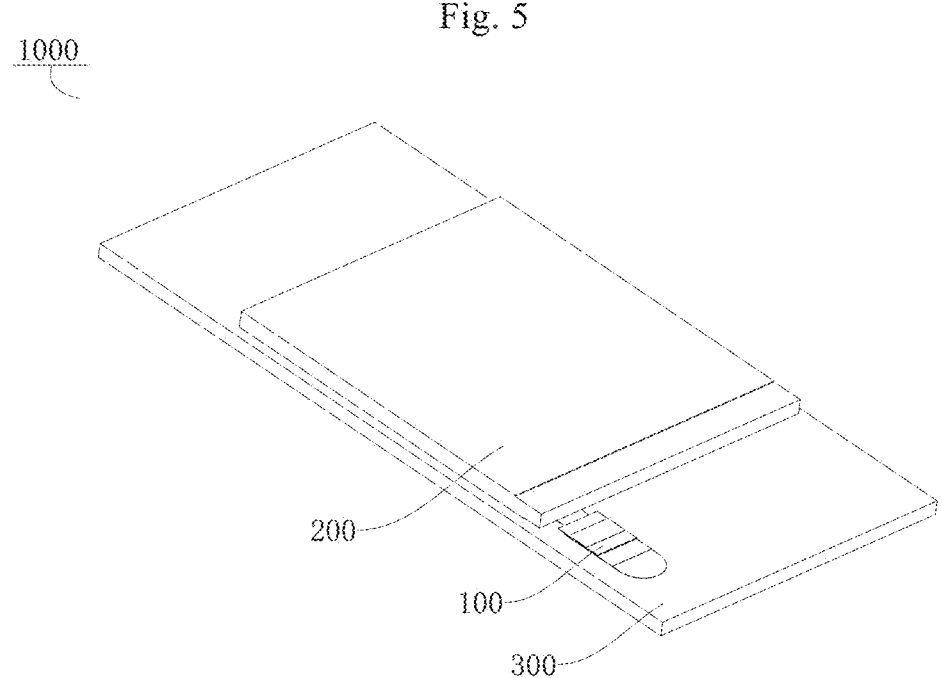
FIG. 6 illustrates a perspective view of a housing assembly according to an embodiment of the present disclosure, in which a pull is broken from a tear line.
Figure 7:
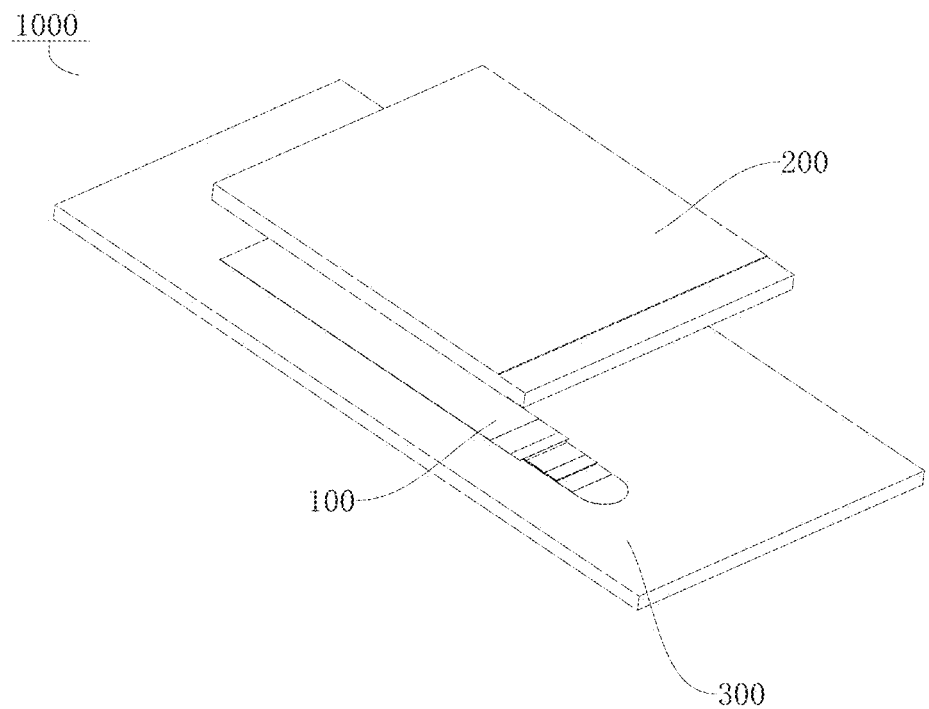
FIG. 7 illustrates an exploded view of a housing assembly according to an embodiment of the present disclosure.
Figure 8:
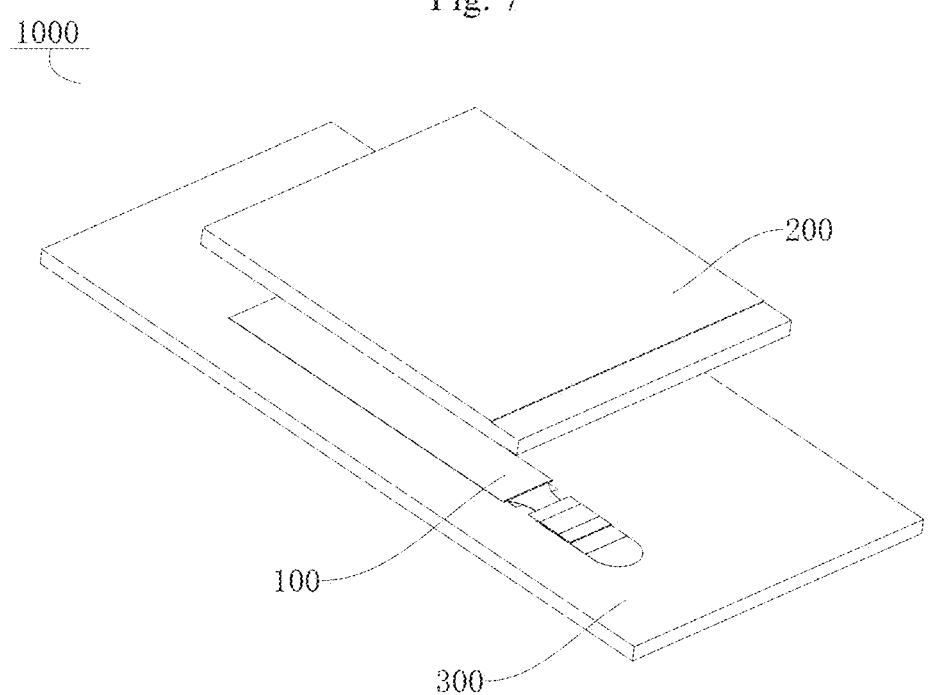
FIG. 8 illustrates an exploded view of a housing assembly according to an embodiment of the present disclosure, in which a pull is broken from a tear line.

In some embodiments of the present disclosure, as illustrated in FIGS. 3 and 4, a double-sided adhesive 6 is provided between the pull portion 11 and the first pull layer 2, so as to facilitate connection between the pull portion 11 and the first pull layer 2, enhance reliability of the connection between the pull portion 11 and the first pull layer 2, prevent water vapor from invading the pull portion 11 arranged corresponding to the first pull layer 2, and avoid the failure and breakage of the pull portion 11. Further, the double-sided adhesive 6 between the pull portion 11 and the first pull layer 2 is spaced apart from the tear line 23. Thus, it is ensured that the first pull layer 2 is broken in time when subjected to the drawing force.

For instance, in examples illustrated by FIGS. 3 and 4, the tear line 23 is provided at a left end (i.e. the left end as illustrated in FIG. 3) of the first pull layer 2, the double-sided adhesive 6 between the first pull layer 2 and the pull portion 11 is provided at a right end (i.e. the right end as illustrated in FIG. 3) of the first pull layer 2, and the double-sided adhesive 6 between the first pull layer 2 and the pull portion 11 is spaced apart from the tear line 23 to avoid the failure of timely breakage of the first pull layer 2 due to the adhesion of the double-sided adhesive 6 when the first pull layer 2 is subjected to the drawing force, so as to ensure that the stretch releasing adhesive layer 1 can be pulled out easily.

In some embodiments of the present disclosure, as illustrated in FIGS. 1-4, along the length direction of the stretch releasing adhesive layer 1 (the left-and-right direction as illustrated in FIG. 1), the first pull layer 2 includes a first segment 21 and a second segment 22, the first segment 21 is superposed on the pull portion 11 and connected with the pull portion 11, the tear line 23 is provided on the first segment 21, an end of the second segment 22 is connected with an end of the first segment 21, and the second segment 22 goes beyond the pull portion 11. Thus, the length of the first pull layer 2 can be relatively increased, so as to facilitate the pull-out of the stretch releasing adhesive layer 1.

In some embodiments of the present disclosure, an included angle α between the tear line 23 and the length direction of the stretch releasing adhesive layer 1 satisfies $0<\alpha\leq 90°$. Further, a satisfies $45°<\alpha\leq 90°$. Furthermore, α satisfies $\alpha=90°$. Thus, the breakage of the first pull layer 2 at the tear line 23 can be facilitated when the first pull layer 2 is subjected to the drawing force, so as to make it easy to pull out the stretch releasing adhesive layer 1.

In some embodiments of the present disclosure, as illustrated in FIGS. 3 and 4, the stretch releasing adhesive assembly 100 further includes a second pull layer 4, the second pull layer 4 and the pull portion 11 are superposed, and the second pull layer 4 is located at a side of the pull portion 11 away from the first pull layer 2. Thus, it is possible to prevent the side of the pull portion 11 away from the first pull layer 2 from bonding to other components, so as to facilitate the use of the pull portion 11.

Further, as illustrated in FIGS. 3 and 4, a double-sided adhesive 6' is also provided between the second pull layer 4 and the pull portion 11. Thus, it is possible to facilitate the bonding between the second pull layer 4 and the pull portion 11, enhance reliability of the bonding between the pull portion 11 and the second pull layer 4, and avoid the separation of the second pull layer 4 from the pull portion 11.

Furthermore, as illustrated in FIGS. 1-4, the second pull layer 4 is spaced apart from at least one tear line 23 in the length direction of the stretch releasing adhesive layer 1. Thus, the breakage of the first pull layer 2 at the tear line 23 when subjected to the drawing force can be facilitated, so as to facilitate the pull-out of the stretch releasing adhesive layer 1.

Optionally, the second pull layer 4 is provided with the tear line 23 arranged opposite to the tear line 23 on the first pull layer 2, such that it is convenient for the second pull layer 4 to break at its tear line 23 and the first pull layer 2 to break at its own tear line 23, so as to pull out the stretch releasing adhesive layer 1 easily.

Figure 9:
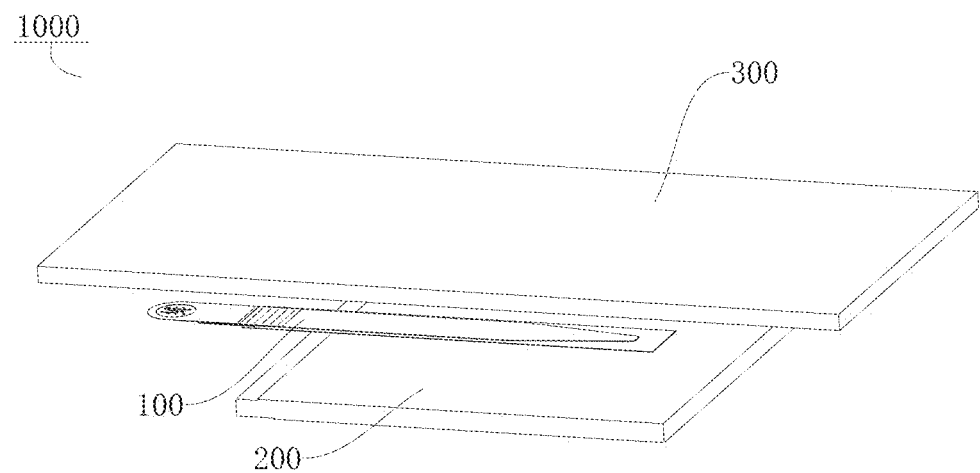
FIG. 9 illustrates an exploded view from another angle of a housing assembly according to an embodiment of the present disclosure.
Figure 10:
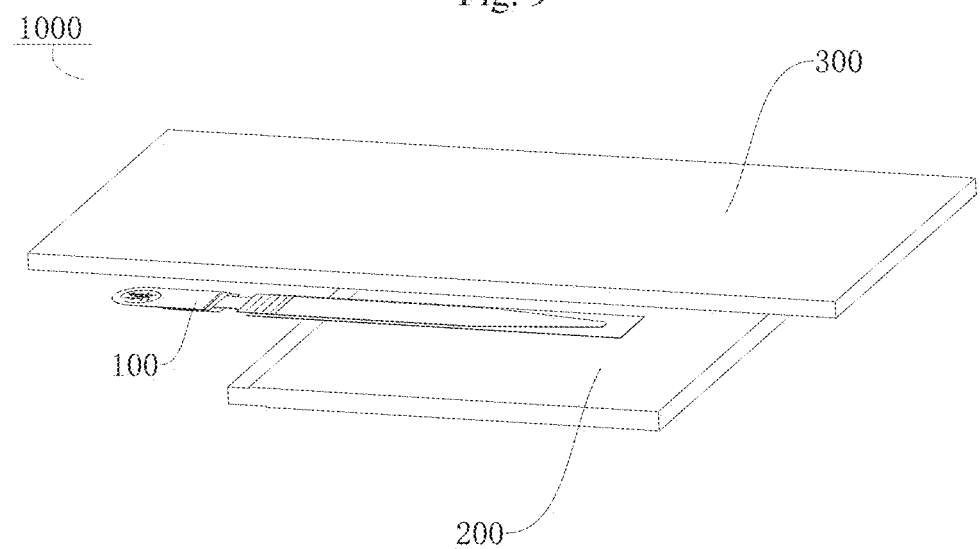
FIG. 10 illustrates an exploded view from another angle of a housing assembly according to an embodiment of the present disclosure, in which a pull is broken from a tear line.

In some embodiments of the present disclosure, the stretch releasing adhesive assembly 100 further includes a covering film 5. The covering film 5 and the stretch releasing adhesive layer 1 are superposed, and the covering film 5 is located at a side of the stretch releasing adhesive layer 1 away from the first pull layer 2, and a side of the covering film 5 away from the stretch releasing adhesive layer 1 is also provided with a double-sided adhesive 6". As illustrated in FIGS. 9 and 10, at a step position in the head of the battery 200, a housing 300 is not bonded with the battery 200 directly through the stretch releasing adhesive due to a factor of thickness, thereby resulting in exposure of the stretch releasing adhesive. The stretch releasing adhesive is covered with the covering film 5 to prevent water vapor from getting contact with the stretch releasing adhesive in a bonding direction and avoid the aging of the stretch releasing adhesive. Meanwhile, the adoption of the covering film 5 can reduce the friction between the stretch releasing adhesive layer 1 and the battery 200.

Further, the covering film 5 is a polyethylene terephthalate (chemical formula: $COC_6H_4COOCH_2CH_2O$, shortened as PET) film or a polyimide (PI) film. The covering film 5 has a width larger than or equal to the width of the stretch releasing adhesive layer 1, so as to facilitate the use of the stretch releasing adhesive layer 1.

The housing assembly 1000 according to embodiments of the present disclosure will be described with reference to FIGS. 1-11.

As illustrated in FIGS. 5-10, the housing assembly 1000 according to embodiments of the present disclosure includes the housing 300, the battery 200, and the above stretch releasing adhesive assembly 100.

Specifically, the battery 200 is arranged on the housing 300, the stretch releasing adhesive assembly 100 is arranged between the housing 300 and the battery 200, and at least a part of the pull portion 11 goes beyond an end face of the battery 200. Thus, it is ensured that the stretch releasing adhesive layer 1 is not exposed to the outside, thereby avoiding the breakage of the stretch releasing adhesive layer 1 due to the influence of water vapor, and guaranteeing operational reliability of the stretch releasing adhesive assembly 100.

For the housing assembly 1000 according to embodiments of the present disclosure, by providing the pull portion 11 of the stretch releasing adhesive layer 1 with the first pull layer 2, and providing the first pull layer 2 with at least one tear line 23, the function of hiding and shielding the pull portion 11 of the stretch releasing adhesive layer 1 can be satisfied, and the first pull layer 2 can be broken in time when in need of being pulled, such that the stretch releasing adhesive layer 1 is able to be pulled out easily.

In some embodiments of the present disclosure, as illustrated in FIGS. 5-10, a side of the stretch releasing adhesive layer 1 facing the first pull layer 2 is connected with the housing 300, so as to facilitate the pull of the first pull layer 2. Certainly, the present disclosure is not limited thereto—the side of the stretch releasing adhesive layer 1 facing the first pull layer 2 can be connected with the battery 200.

The mobile terminal 2000 according to embodiments of the present disclosure will be described with reference to FIGS. 1-11.

Figure 11:
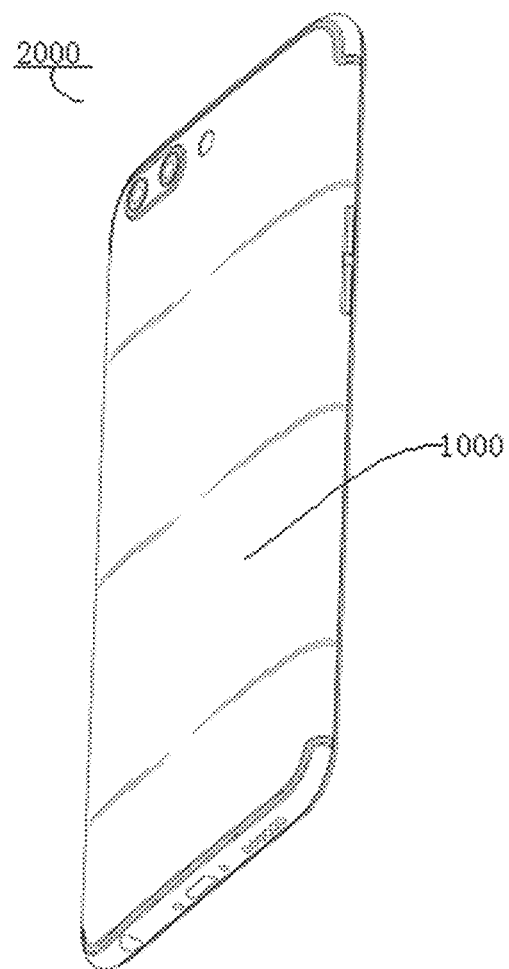
FIG. 11 illustrates a schematic view of a mobile terminal according to an embodiment of the present disclosure.

As illustrated in FIG. 11, the mobile terminal 2000 according to embodiments of the present disclosure includes the above housing assembly 1000.

For the terminal according to embodiments of the present disclosure, by providing the pull portion 11 of the stretch releasing adhesive layer 1 with the first pull layer 2, and providing the first pull layer 2 with at least one tear line 23, the function of hiding and shielding the pull portion 11 of the stretch releasing adhesive layer 1 can be satisfied, and the first pull layer 2 can be broken in time when in need of being pulled, such that the stretch releasing adhesive layer 1 is able to be pulled out easily.

In some embodiments of the present disclosure, the mobile terminal 2000 may be a mobile phone, a tablet computer, a notebook computer, or the like.

The mobile terminal 2000 according to a specific embodiment of the present disclosure will be described with reference to FIGS. 1-11. It could be understood that the following description is only explanatory rather than a specific limitation on the present disclosure.

In this embodiment, the mobile terminal 2000 may be various devices capable of acquiring data from the outside and processing the data, or the mobile terminal 2000 may be any device that has a built-in battery 200 and is capable of receiving current from the outside to charge the battery 200, such as a mobile phone, a tablet computer, a computing device or an information display device.

The mobile phone is taken as an example to introduce the mobile terminal 2000 to which the present disclosure is applicable. The mobile phone can include an ultrasonic chip, a radio frequency circuit, a memory, an input unit, a wireless fidelity (Wi-Fi) module, a display unit, a sensor, an audio circuit, a processor, a projection unit, a photographing unit, a battery 200, and a stretch releasing adhesive assembly 100, a housing assembly 1000, and other components.

Specifically, as illustrated in FIG. 11, the mobile terminal 2000 includes the housing assembly 1000. As illustrated in FIGS. 1-10, the housing assembly 1000 includes the battery 200, the housing 300, and the stretch releasing adhesive assembly 100.

As illustrated in FIGS. 1-4, the stretch releasing adhesive assembly 100 includes the stretch releasing adhesive layer 1, the first pull layer 2, the second pull layer 4, and the covering film 5. The left end of the stretch releasing adhesive layer 1 has a pointed end that is gradually increasing in width along the left-to-right direction, while the right end of the stretch releasing adhesive layer 1 is a flat end and has the pull portion 11.

As illustrated in FIGS. 1-4, the first pull layer 2 includes the first segment 21 and the second segment 22, the first segment 21 is superposed on the pull portion 11 and connected with the pull portion 11, and the second segment 22 goes beyond the pull portion 11. The left end of the first segment 21 is provided with a plurality of tear lines 23 arranged in perpendicular to the length direction of the stretch releasing adhesive layer 1, and the plurality of tear lines 23 are disposed in parallel. The double-sided adhesive 6 is provided between the first segment 21 and the stretch releasing adhesive layer 1, is located at a right end of the first segment 21 of the first pull layer 2, and is spaced apart from the tear line 23. Additionally, the width of the first pull layer 2 is identical to the width of the stretch releasing adhesive layer 1.

As illustrated in FIGS. 1-4, the second pull layer 4 and the pull portion 11 are superposed, and the second pull layer 4 is located at the side of the pull portion 11 away from the first pull layer 2. The second pull layer 4 is spaced apart from the tear line 23 in the length direction of the stretch releasing adhesive layer 1, and the double-sided adhesive 6' is provided between the second pull layer 4 and the stretch releasing adhesive layer 1 to enhance the reliability of connection between the second pull layer 4 and the stretch releasing adhesive layer 1. In addition, the width of the second pull layer 4 is identical to the width of the stretch releasing adhesive layer 1, the length of the second pull layer 4 is smaller than the length of the first pull layer 2, and a right end of the second pull layer 4 is flush with the right end of the stretch releasing adhesive layer 1.

As illustrated in FIGS. 1-4, the side of the stretch releasing adhesive layer 1 away from the first pull layer 2 is provided with the covering film 5, and the covering film 5 may be a PET film. The covering film 5 can partially overlap with the second pull layer 4, and in the overlapping part, the covering film 5 is located in a side of the second pull layer 4 away from the stretch releasing adhesive layer 1. In addition, the side of the covering film 5 away from the stretch releasing adhesive layer 1 is provided with the double-sided adhesive 6", and the length of the double-sided adhesive 6" is substantially identical to the length of the stretch releasing adhesive layer 1.

As illustrated in FIGS. 5-10, the stretch releasing adhesive assembly 100 is provided between the housing 300 and the battery 200, and the side of the stretch releasing adhesive layer 1 facing the first pull layer 2 is connected with the housing 300. The stretch releasing adhesive assembly 100 can connect the battery 200 with the housing assembly 1000. When the battery 200 needs to be disassembled, the first pull layer 2 is pulled to remove the battery 200. Meanwhile, the covering film 5 and the double-sided adhesive 6" are left on the surface of the battery 200. The provision of the covering film 5 can reduce the friction of the stretch releasing adhesive layer 1.

The stretch releasing adhesive layer 1 is subjected to a bonding shear force from the battery 200 and the housing 300 when pulled, and if the first pull layer 2 is not provided with the incision (i.e. the tear line 23), the first pull layer 2 will not be broken or deformed even when subjected to a large force, and thus the first pull layer 2 cannot be pulled to move. With the tear line 23, not only the function of hiding and shielding the stretch releasing adhesive layer 1 can be satisfied, but also the first pull layer 2 breaks in time when in need of being pulled, so as to enable the stretch releasing adhesive layer 1 to be pulled out easily.

The display unit can be embedded in a front side of the mobile terminal 2000 and coupled with the housing 300. The display unit can be configured to display information input by or presented to the user, and various menus of the mobile phone. The display unit can include a display panel, and optionally, the display panel can be configured in forms of a liquid crystal display (LCD), an organic light-emitting diode (OLED) and the like. Further, the touch panel can overlay the display panel; when the touch panel detects a touch operation on or near it, the touch operation is sent to the processor to determine which type the touch event belongs to, and then the processor provides corresponding visual output on the display panel according to the type of the touch event. The location, which can be recognized by the user's eye in the display panel, besides the visual output, can serve as a "display area" described later. The touch panel and the display panel can be two separate components to achieve input and output functions of the mobile phone, or can be integrated to achieve the input and output functions of the mobile phone.

The radio-frequency (RF) circuit can be used to receive and transmit a signal during information transmission and reception or during a call. Especially, when downlink information from a base station is received, the RF circuit sends the downlink information to the processor for processing, and additionally sends uplink data from the mobile phone to the base station. Usually, the RF circuit includes but is not limited to an antenna, at least one amplifier, a transceiver, a coupler, a low-noise amplifier, a duplexer and etc. In addition, the RF circuit can communicate with the network and other devices via wireless communication. The wireless communication can employ any communication standard or protocol, including but not limited to global system for mobile communication (GSM), general packet radio service (GPRS), code division multiple access (CDMA), wideband code division multiple access (WCDMA), long term evolution (LTE), e-mail and short messaging service (SMS).

The memory can be used to store software programs and modules, and the processor runs various software applications in the mobile phone and performs data processing by running the software programs and modules stored in the memory. The memory can mainly include a program storage area and a data storage area. The program storage area can store an operating system, at least one application program required for a function (such as a voice playback function, an image playback function and etc.); the data storage area can store data (such as audio data, contacts and etc.) created according to the use of the mobile phone. In addition, the memory can include a high-speed random access memory, and can also include a non-volatile memory, such as at least one disk storage device and flash memory device, or include other volatile solid state memory devices.

The input unit can be configured to receive incoming numbers or character information, and generate a key signal related to user settings and function control of the mobile phone. Specifically, the input unit can include a touch panel and other input devices. The touch panel, also known as a touch screen, can collect a touch operation made by a user on or near the touch panel (for example, an operation made by the user on the touch panel or near the touch panel by means of a finger, a touch pen or any other suitable object or accessory), and drive the corresponding connection device according to a preset program. Optionally, the touch panel can include a touch detection device and a touch controller. The touch detection device is configured to detect a touch orientation of the user, detect a signal from the touch operation, and transmit the signal to the touch controller. The touch controller is configured to receive the touch signal from the touch detection device, convert it into contact coordinates and send the contact coordinates to the processor, and can be configured to receive and execute a command from the processor. In addition, it is possible to realize the touch panel in resistive type, capacitive type, infrared type, surface acoustic wave type and other types. The input unit can include other input devices apart from the touch panel. Specifically, other input devices can include, but are not limited to one or more of a physical keypad, a function key (e.g. a volume control button, an on/off button, etc.), a trackball, a mouse and an operating rod.

In addition, the mobile phone can also include at least one sensor, such as an attitude sensor, a light sensor and other sensors.

Specifically, the attitude sensor can also be referred as a motion sensor, and as one kind of motion sensor, a gravity sensor can be employed. As for the gravity sensor, a cantilever displacement device is made of an elastic-sensitive element, and an electrical contact is driven by an energy-storage spring made of the elastic-sensitive element, so as to achieve the conversion of gravity changes into electrical signal changes.

As an alternative motion sensor, an accelerometer sensor can be used. The accelerometer sensor can detect the magnitude of acceleration in all directions (generally in three axes), and detect the magnitude and direction of the gravity at rest, and can be used for attitude identification of the mobile phone (such as horizontal and vertical screen switch, related games, magnetometer attitude calibration), and vibration-recognition related functions (such as pedometer and percussion).

In the embodiments of the present disclosure, the motion sensors listed above can be used as an element for obtaining an "attitude parameter" described later, which is not limited thereto, however. Other sensors capable of obtaining the "attitude parameter" fall into the protection scope of the present disclosure, for example, a gyroscope. The working principle and data processing of the gyroscope can be similar to the related art, so the detailed description thereof will be omitted to avoid redundancy.

In addition, in the embodiments of the present disclosure, a barometer, a hygrometer, a thermometer, an infrared sensor and the like can be used as a sensor, which will not be described in detail.

The light sensor can include an ambient light sensor and a proximity sensor, in which the ambient light sensor can adjust brightness of the display panel in accordance with the ambient light, and the proximity sensor can turn off the display panel and/or backlight when the mobile phone is moved to the ear.

The audio circuit, the loudspeaker and the microphone can provide an audio interface between the user and the mobile phone. The audio circuit can transmit an electrical signal converted from the received audio data to the loudspeaker, and the loudspeaker converts the electrical signal into an audio signal to be output. On the other hand, the microphone converts the collected audio signal into the electrical signal, and the audio circuit receives and converts the electrical signal into audio data, and transmits the audio data to the processor. After processed by the processor, the audio data is sent to, for example, another mobile phone via the RF circuit, or is output to the memory for further processing.

Wi-Fi is a short distance wireless transmission technology, and the mobile phone can help the user send and receive e-mails, browse websites, and access streaming media through the Wi-Fi module which provides the user with wireless broadband access to the Internet.

The processor is a control center of the mobile phone, is connected to various parts of the mobile phone by means a variety of interfaces and lines, and performs various functions of the mobile phone and data processing by running or executing software programs and/or modules stored in the memory and by invoking the data stored in the memory, so as to monitor the mobile phone overall. Optionally, the processor can include one or more processing units; preferably, the processor can be integrated with an application processor and a modem processor, in which the application processor mainly handles the operating system, the user interface and the application program, while the modem processor mainly deals with wireless communication.

It could be understood that the modem processor may not be integrated into the processor.

Moreover, the processor can act as an implementing element of the processing unit, to perform the same or similar function as the processing unit.

It should be noted that the mobile phone is only an example of the electronic device 1 and is not constructed to limit the present disclosure. The present disclosure can be applied to the electronic device 1 such as a mobile phone, a tablet computer and so on, and the present disclosure is not limited thereto. Reference throughout this specification to "an embodiment," "some embodiments," "an exemplary embodiment," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although embodiments have been illustrated and described, it would be appreciated by those skilled in the art that changes, modifications, alternatives and variants can be made in the embodiments without departing from principles and purposes of the present disclosure. The protection scope of the present disclosure is defined by the claims or the like.

What is claimed is:

1. A stretch releasing adhesive assembly, comprising:
a stretch releasing adhesive layer, having a pull portion at an end of the stretch releasing adhesive layer;
a first pull layer, the first pull layer and the pull portion being superposed and connected, the first pull layer being provided with at least one tear line in a position corresponding to the pull portion, the first pull layer being a distinct layer from the stretch releasing adhesive layer, and disposed along a length direction of the stretch releasing adhesive layer, the first pull layer comprising:
a first segment, the first segment and the pull portion being superposed and connected, the tear line being provided on the first segment; and
a second segment having an end connected with an end of the first segment, the second segment extending past the pull portion; and
a double-sided adhesive provided between the pull portion and the first pull layer.

2. The stretch releasing adhesive assembly according to claim 1, wherein the stretch releasing adhesive layer is in a strip shape.

3. The stretch releasing adhesive assembly according to claim 1, wherein the tear line is an incision formed by partially incising the first pull layer along a length direction of the tear line.

4. The stretch releasing adhesive assembly according to claim 1, wherein a plurality of tear lines are provided and arranged in parallel.

5. The stretch releasing adhesive assembly according to claim 1, wherein the double-sided adhesive between the first pull layer and the pull portion is spaced apart from the tear line.

6. The stretch releasing adhesive assembly according to claim 1, wherein the tear line forms an included angle $\alpha$ relative to a length direction of the stretch releasing adhesive layer, and a satisfies $0 < \alpha \leq 90°$.

7. The stretch releasing adhesive assembly according to claim 6, wherein a satisfies $45° < \alpha \leq 90°$.

8. The stretch releasing adhesive assembly according to claim 7, wherein a satisfies $\alpha = 90°$.

9. The stretch releasing adhesive assembly according to claim 1, further comprising a covering film, the covering film and the stretch releasing layer being superposed, and the covering film being located at a side of the stretch releasing adhesive layer away from the first pull layer.

10. The stretch releasing adhesive assembly according to claim 9, wherein a side of the covering film away from the stretch releasing adhesive layer is provided with a double-sided adhesive.

11. The stretch releasing adhesive assembly according to claim 1, further comprising a second pull layer, the second pull layer and the pull portion being superposed, and the second pull layer being located at a side of the pull portion away from the first pull layer.

12. The stretch releasing adhesive assembly according to claim 11, wherein the second pull layer is provided with the tear line arranged opposite to the tear line on the first pull layer.

13. The stretch releasing adhesive assembly according to claim 11, wherein a double-sided adhesive is provided between the second pull layer and the pull portion.

14. The stretch releasing adhesive assembly according to claim 11, wherein along a length direction of the stretch releasing adhesive layer, the second pull layer is spaced apart from the at least one tear line.

15. A housing assembly, comprising:
a housing;
a battery provided on the housing;
a stretch releasing adhesive assembly comprising:
a stretch releasing adhesive layer, having a pull portion at an end of the stretch releasing adhesive layer;
a first pull layer, the first pull layer and the pull portion being superposed and connected, the first pull layer being provided with at least one tear line in a position corresponding to the pull portion, the first pull layer being a distinct layer from the stretch releasing adhesive layer, and disposed along a length direction of the stretch releasing adhesive layer, the first pull layer comprising:
a first segment, the first segment and the pull portion being superposed and connected, the tear line being provided on the first segment; and
a second segment having an end connected with an end of the first segment, the second segment extending past the pull portion; and
a double-sided adhesive provided between the pull portion and the first pull layer.

16. The housing assembly according to claim 15, wherein a side of the stretch releasing adhesive layer facing the first pull layer is connected with the housing.

17. The housing assembly according to claim 15, wherein a side of the stretch releasing adhesive layer facing the first pull layer is connected with the battery.

18. The housing assembly according to claim 15, further comprising a second pull layer, the second pull layer and the pull portion being superposed, and the second pull layer being located at a side of the pull portion away from the first pull layer.

19. The housing assembly according to claim 15, wherein the second pull layer is provided with the tear line arranged opposite to the tear line on the first pull layer.

20. A mobile terminal, comprising a housing assembly, the housing assembly comprising:
a housing;
a battery provided on the housing;
a stretch releasing adhesive assembly comprising:
a stretch releasing adhesive layer, having a pull portion at an end of the stretch releasing adhesive layer;
a first pull layer, the first pull layer and the pull portion being superposed and connected, the first pull layer being provided with at least one tear line in a position corresponding to the pull portion, the first pull layer being a distinct layer from the stretch releasing adhesive layer, and disposed along a length direction of the stretch releasing adhesive layer, the first pull layer comprising:

a first segment, the first segment and the pull portion being superposed and connected, the tear line being provided on the first segment; and a second segment having an end connected with an end of the first segment, the second segment extending past the pull portion; and a double-sided adhesive provided between the pull portion and the first pull layer.

* * * * *